UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF AMMONIA.

1,128,843.   Specification of Letters Patent.   Patented Feb. 16, 1915.

No Drawing.   Application filed November 11, 1912.   Serial No. 730,645.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in the Production of Ammonia, of which the following is a specification.

We have discovered that we can obtain ammonia in good yield while making use of gaseous nitrogen and hydrogen, by passing the said gases successively and periodically over a catalytic agent which contains two or more metals and which is capable of combining directly with at least one of the two gases nitrogen and hydrogen. Instead of one or more of the metals themselves, a nitrogen or hydrogen compound thereof can, in some cases, be employed, since during the progress of the reaction such compounds may be formed. Consequently, for the purposes of this invention, nitrogen and hydrogen compounds of the metals are to be regarded as the equivalents of the metals themselves. Instead of starting with the metals themselves, compounds thereof, such for instance as their carbids, can be employed, which during the reaction give rise to the metals or their nitrogen or hydrogen compounds. If the mixture, or one of the constitutents thereof, be adversely affected by oxygen or water vapor, precautions must be taken to prevent this occurring and also steps must be taken to prevent the presence of contact poisons. If desired, one or more than one body which will promote the power of the mixture, as described in the specifications of British Patents Nos. 19,249/10, 5833 and 5835/11, may be added to the mixture. We prefer generally to employ temperatures not exceeding 600° C. during the production of the ammonia and it is sometimes advantageous to employ different temperatures during the two periods of passing the nitrogen and hydrogen respectively over the mixture. As particular instances of mixtures of metals which are capable of use according to our invention, we mention those which contain at least one of the metals of the iron group, namely iron, nickel, cobalt, manganese, chromium, molybdenum, tungsten and uranium, although we do not regard our invention as being restricted to such mixtures.

The following example will serve to illustrate further the nature of our invention, which, however, is not confined to this example: Pass a current of nitrogen, which may contain small quantities of hydrogen without departing from the nature of our invention, into a vessel containing lithium, manganese nitrid, at from 450° to 550° C., until a pressure of about 50 atmospheres is attained. Then stop the supply of nitrogen and allow it to be absorbed by the lithium-manganese nitrid, whereby the pressure drops in accordance with the amount absorbed and is also dependent upon the size of the apparatus and the quantity of the mixture employed. It may be reduced to from, say, 30 to 40 atmospheres, or even less. Then remove the nitrogen and pass hydrogen over the mixture, whereupon ammonia is formed and can be absorbed from the gases leaving the vessel. This operation is also preferably carried out at a pressure of fifty atmospheres and at the same temperature of from 450° to 550° C. employed in the first part of the operation. When the formation of ammonia decreases, repeat the cycle of operations.

Instead of lithium-manganese nitrid, other suitable mixtures as aforesaid can be employed, such for instance as nickel with molybdenum, or barium with chromium.

Now what we claim is:—

1. The process of producing ammonia by passing nitrogen and hydrogen successively and periodically over a catalytic agent which contains a plurality of metals and which is capable of combining directly with at least one of the said gases nitrogen and hydrogen.

2. The process of producing ammonia by passing nitrogen and hydrogen successively and periodically over a catalytic agent which contains a plurality of metals, one of which belongs to the iron group, and which catalytic agent is capable of combining directly with one of the said gases, nitrogen and hydrogen.

3. The process of producing ammonia by passing nitrogen and hydrogen successively and periodically under pressure over a catalytic agent which contains a plurality of metals, of which one belongs to the iron group, and which catalytic agent is capable of combining directly with one of the said gases, nitrogen and hydrogen.

4. The process of producing ammonia by passing nitrogen and hydrogen successively and periodically over a catalytic agent which contains lithium and manganese.

5. The process of producing ammonia by passing nitrogen and hydrogen successively and periodically under pressure over a catalytic agent which contains lithium and manganese.

6. The process of producing ammonia by passing nitrogen and hydrogen successively and periodically under pressure over a catalytic agent which contains a plurality of metals and which is capable of combining directly with at least one of said gases, nitrogen and hydrogen.

In testimony whereof we have hereunto set our hands in the presence of two subscribing witnesses.

CARL BOSCH.
ALWIN MITTASCH.

Witnesses:
 T. ALEC. LLOYD,
 JOSEPH PFEIFFER.